United States Patent [19]

Lenczyk

[11] Patent Number: 5,758,550
[45] Date of Patent: Jun. 2, 1998

[54] CONNECTING ROD FOR AN INTERNAL COMBUSTION ENGINE

[76] Inventor: Robert W. Lenczyk, 169 Fair Haven Rd., Fair Haven, N.J. 07704

[21] Appl. No.: 695,107

[22] Filed: Aug. 8, 1996

[51] Int. Cl.⁶ .................................................. F16C 7/00
[52] U.S. Cl. .................................... 74/579 E; 74/593
[58] Field of Search .......................... 74/579 E, 579 R, 74/587, 588, 593

[56] References Cited

U.S. PATENT DOCUMENTS

| | | | |
|---|---|---|---|
| 1,260,557 | 3/1918 | Layman | 74/588 |
| 1,418,083 | 5/1922 | Layman | 74/588 |
| 1,462,833 | 7/1923 | Soulis | 74/588 |
| 3,482,467 | 12/1969 | Volkel | 74/579 R |
| 3,482,468 | 12/1969 | Biasse | 74/579 E |
| 3,791,234 | 2/1974 | Kastan et al. | |
| 4,422,348 | 12/1983 | Campbell | 74/579 E |
| 4,458,555 | 7/1984 | Holtzberg et al. | 74/579 E |
| 4,583,421 | 4/1986 | Rose | |
| 5,524,507 | 6/1996 | Olmr et al. | 74/579 E |

FOREIGN PATENT DOCUMENTS

| | | | |
|---|---|---|---|
| 1018676 | 10/1957 | Germany | 74/579 E |
| 554172 | 5/1977 | U.S.S.R. | 74/579 E |

*Primary Examiner*—Charles A. Marmor
*Assistant Examiner*—Mary Ann Battista

[57] ABSTRACT

A connecting rod for an internal combustion engine including an elongated rod portion. Also, a first annular portion is integral with a first end of the rod portion. The first annular portion has a bore therethrough for engaging an engine piston pin. Additionally, a second annular portion is integral with a second end of the rod portion. The second annular portion is opposite the first annular portion. The second annular portion is divided into symmetrical halves that form a distal member and a proximal member. Lastly, an alignment portion is integral with each side of the distal member and the proximal member. Whereby, the proximal member and distal member are coupled by placing a rod bolt into each alignment portion.

1 Claim, 3 Drawing Sheets

CONNECTING ROD FOR AN INTERNAL COMBUSTION ENGINE

BACKGROUND OF THE INVENTION

1. Field of the Invention

The present invention relates to a connecting rod for an internal combustion engine and more particularly pertains to increasing horse power with a connecting rod made of maraging steel and further having an elliptical cross section for minimizing stress points.

2. Description of the Prior Art

The use of a connecting rod is known in the prior art. More specifically, connecting rods heretofore devised and utilized for the purpose of piston and crank connection in an internal combustion engine are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,391,161 to Ban and Arai disclosed a connecting rod of internal combustion engine. U.S. Pat. No. 5,383,429 to Donahue, Cleary and Stinson discloses a hypereutectic aluminum-silicon alloy connecting rod for a two-cycle internal combustion engine. U.S. Pat. Des. 287,329 to Hamatani discloses a push rod holder for diesel engine with installed aftercooler. U.S. Pat. No. 5,146,883 to Peipert, Kolb, Mielke, Coners and Reichenbach disclose a piston and connecting rod assembly. U.S. Pat. No. 4,494,286 to Kaufman discloses a connecting rod arrangement. Lastly, U.S. Pat. No. 4,745,817 to Tomita and Asakura discloses a piston/crank connection mechanism for an internal combustion engine.

While these devices fulfill their respective, particular objectives and requirements, the aforementioned patents do not describe connecting rod for an internal combustion engine that allows for a lower weight rotating/reciprocating assembly by making the connecting rods from maraging steel that allows for a more efficient shape of the rod.

In this respect, the connecting rod for an internal combustion engine according to the present invention substantially departs from the conventional concepts and designs of the prior art, and in doing so provides an apparatus primarily developed for the purpose of to increasing horse power with a connecting rod made of maraging steel and further having an elliptical cross section for minimizing stress points.

Therefore, it can be appreciated that there exists a continuing need for a new and improved connecting rod for an internal combustion engine which can be used for to increasing horse power with a connecting rod made of maraging steel and further having an elliptical cross section for minimizing stress points. In this regard, the present invention substantially fulfills this need.

SUMMARY OF THE INVENTION

In view of the foregoing disadvantages inherent in the known types of connecting rods now present in the prior art, the present invention provides an improved connecting rod for an internal combustion engine. As such, the general purpose of the present invention, which will be described subsequently in greater detail, is to provide a new and improved connecting rod for an internal combustion engine and method which has all the advantages of the prior art and none of the disadvantages.

To attain this, the present invention essentially comprises an elongated rod portion. The rod portion has an elliptical cross section and is made of maraging steel. The maraging steel has about a 30 to 85 percent greater yield strength than the usual E4340 steel used to make such rods. Also, a first annular portion is integral a first end of the rod portion. The first annular portion has a bore therethrough. The bore has an internal diameter for engaging an engine piston pin. The bore receives a first brass bushing therein and prior to receiving the piston pin. The first annular portion has an axial oil hole distal the rod portion. Additionally, a second annular portion is integral a second end of the rod portion. The second annular portion is opposite the first annular portion. The second annular portion has a diameter more than twice the diameter of the first annular portion. The second annular portion may be divided into symmetrical halves that form a distal member and a proximal member. An alignment portion is integral each side of the distal member and the proximal member. The alignment portion of the proximal member each have a threaded hole therein. The alignment portion of the proximal member each have a match mark etched into an outer surface. The alignment portion of the distal member each have a hole therethrough. The alignment portion of the distal member each have a match mark etched into an outer surface. The match marks of the proximal and distal members aid in the reattachment of the halves. The threaded hole of the proximal member will align with the hole of the distal member when the match marks of each are aligned. A cylindrical alignment sleeve is positioned within each hole of the distal parts of the distal member. Each alignment sleeve has one half of its length within the hole 54 and another half protruding from the distal parts of the distal member for slip fit with the threaded hole of the proximal parts. Lastly, a second brass bushing is positionable within the second annular portion. The second annular portion is coupled by placing a rod bolt into each alignment portion and through each alignment sleeve. The second bushing is located in the second annular portion of the rod by means of a locating tangs registering each bushing half correctly. The second bushing is positionable about a portion of the crank shaft when the connecting rod is placed within the internal combustion engine.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved connecting rod for an internal combustion engine which has all of the advantages of the prior art connecting rods and none of the disadvantages.

It is another object of the present invention to provide a new and improved connecting rod for an internal combustion engine which may be easily and efficiently manufactured and marketed.

It is further object of the present invention to provide a new and improved connecting rod for an internal combustion engine which is of durable and reliable constructions.

An even further object of the present invention is to provide a new and improved connecting rod for an internal combustion engine which is susceptible of a low cost of manufacture with regard to both materials and labor, and which accordingly is then susceptible of low prices of sale to the consuming public, thereby making such connecting rod for an internal combustion engine economically available to the buying public.

Still yet another object of the present invention is to provide a new and improved connecting rod for an internal combustion engine which provides in the apparatuses and methods of the prior art some of the advantages thereof, while simultaneously overcoming some of the disadvantages normally associated therewith.

Yet another object of the present invention is that through it's unique bye-wing shape, the improved connecting rod will experience less parasitic (windage) losses. Windage is defined as the slowing down effect imparted on the engines rotating assembly, similar to a cars tire being slowed down from a large puddle of water. This bye-wing shape will increase an engines net efficiency.

Even still another object of the present invention is to provide a connecting rod for an internal combustion engine for increasing horse power with a connecting rod made of maraging steel and further having an elliptical cross section for minimizing stress points.

Lastly, it is an object of the present invention to provide a new and improved connecting rod for an internal combustion engine including an elongated rod portion. Also, a first annular portion is integral a first end of the rod portion. The first annular portion has a bore therethrough for engaging an engine piston pin. Additionally, a second annular portion is integral a second end of the rod portion. The second annular portion is opposite the first annular portion. The second annular portion is divided into symmetrical halves that form a distal member and a proximal member. Lastly, an alignment portion is integral each side of the distal member and the proximal member. Whereby, the proximal member and distal member are coupled by placing a rod bolt into each alignment portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
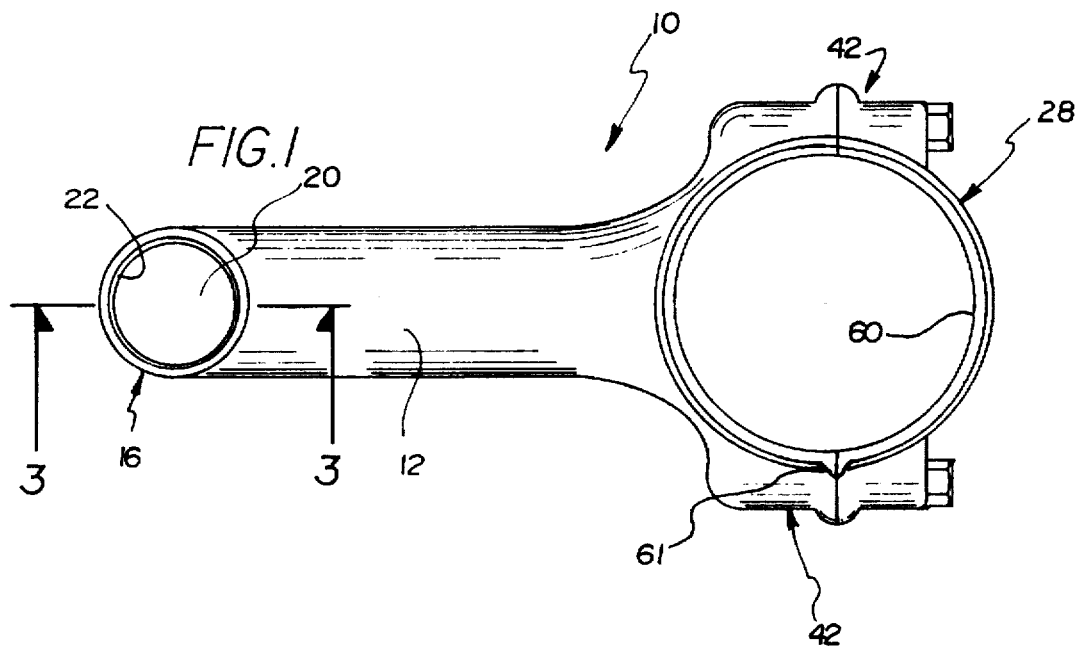
FIG. 1 is a perspective view of the preferred embodiment of the connecting rod for an internal combustion engine constructed in accordance with the principles of the present invention.
Figure 2:
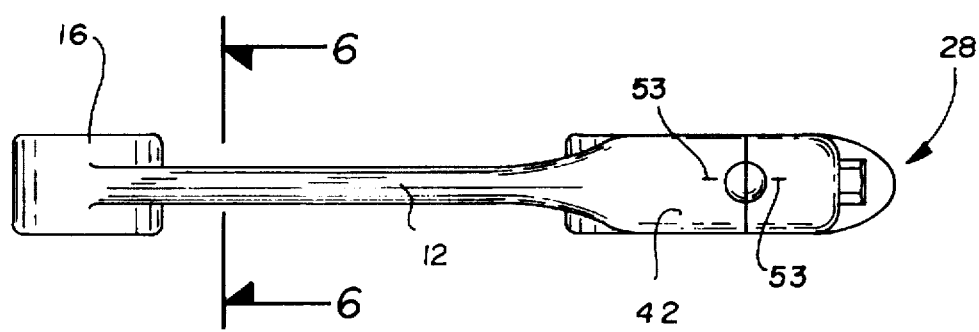
FIG. 2 is a side elevational view of the present invention of FIG. 1.

With reference now to the drawings, and in particular to FIG. 1 thereof, the preferred embodiment of the new and improved connecting rod for an internal combustion engine embodying the principles and concepts of the present invention and generally designated by the reference numeral 10 will be described.

The present invention, the connecting rod for an internal combustion engine 10 is comprised of a plurality of components. Such components in their broadest context include a rod, a first annular portion, and a second annular portion. Such components are individually configured and correlated with respect to each other so as to attain the desired objective.

Figure 6:
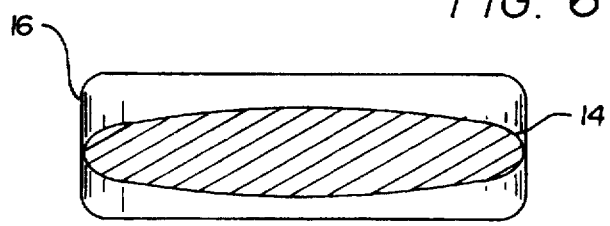
FIG. 6 is cross sectional view of the present invention taken along line 6—6 of FIG. 2.

Specifically, the present invention includes an elongated rod portion 12. The rod has an elliptical cross section 14, as shown in FIG. 6. The elliptical shape of the rod provides optimal stress concentration, and the lowest weight. The rod is made of maraging steel having about a 30 to 85 percent greater yield strength than the common E4340 steel used to produce such rods. More particularly, nominal compositions of commercial maraging steels have the following compositions in weight percent:

| GRADE | Ni | Mo | Co | Ti | Al |
| --- | --- | --- | --- | --- | --- |
| 18 Ni (300) | 18 | 5.0 | 9.0 | 0.7 | 0.1 |
| 18 Ni (350) | 18 | 4.2 (b) | 12.5 | 1.6 (b) | 0.1 |

(a) All grades contain no more than 0.3% Carbon.
(b) Some producers use a combination of 4.8% Mo and 1.4% Ti, nominal.

As best illustrated in FIG. 1, a first annular portion 16 is integral with a first end of the rod portion 12. The first annular portion has a bore 20 therethrough. The bore has an internal diameter for engaging an engine piston pin. The bore is capable of receiving a first brass bushing 22. The first annular portion has an axial oil hole 24 distal the rod portion. The oil hole allows lubrication of the bushing and pin.

Figure 4:
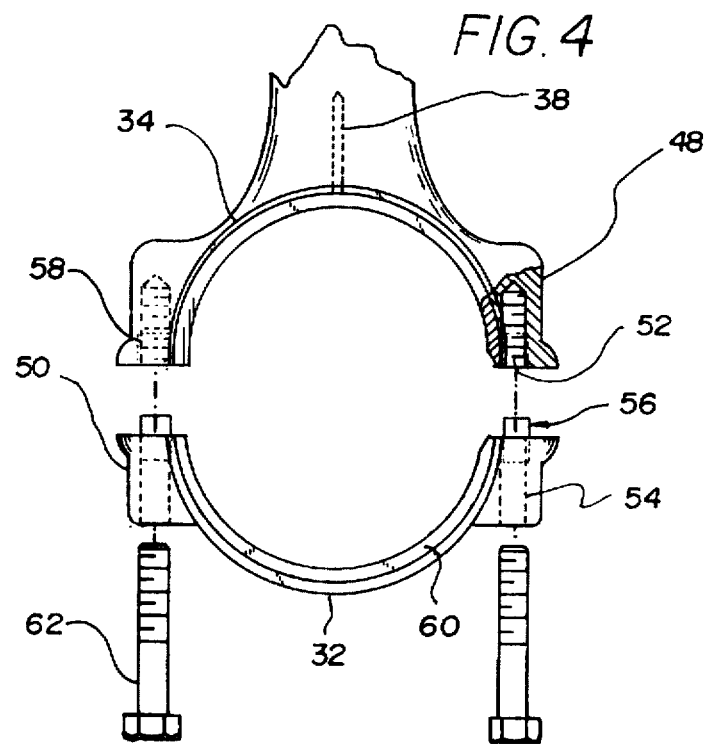
FIG. 4 is cut-away view of the second annular portion of the present invention and showing a cross section of the alignment portions.
Figure 5:
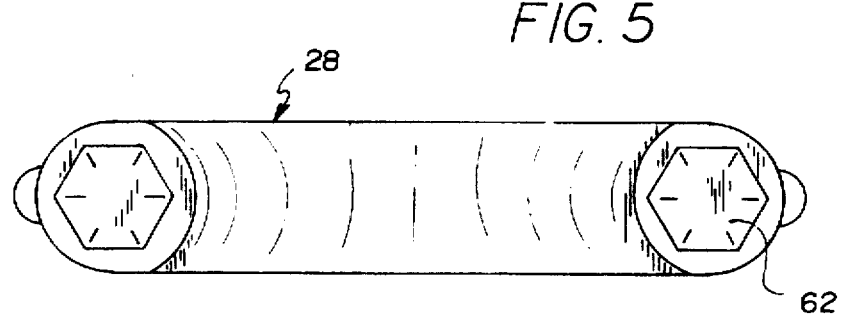
FIG. 5 is a bottom view of the second annular member of the present invention of FIG. 1.

Also, as seen in FIG. 1, a second annular portion 28 is integral with a second end of the rod portion 12. The second annular portion is opposite the first annular portion 16. The second annular portion has a diameter more than twice the diameter of the first annular portion. The second annular portion is divisible into halves. The halves form a distal member 32 and a proximal member 34, as shown in FIG. 4.

The distal member has an elliptical shape and the proximal member has a semi-circular shape.

Figure 3:
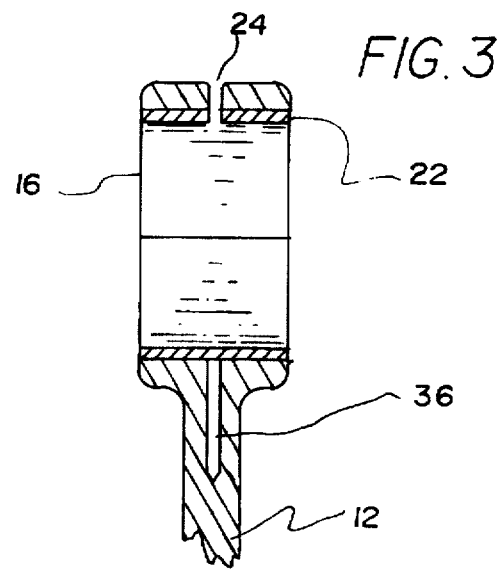
FIG. 3 is cut-away cross-sectional view of the first annular portion of the present invention taken along line 3—3 of FIG. 1.

Additionally, a vertical hole is drilled into each end of the rod. One hole 36, as shown in FIG. 3, is nearest the first end. The one hole's entrance pierces the inner wall of the first annular portion. Another hole 38, as shown in FIG. 4, is nearest the second end of the rod. The other hole's entrance pierces the inner wall of the proximal member 34. Each hole is axially aligned with the other hole within the rod. Each hole is used to weight balance the rod when a set of rods are used in the engine.

Included are a pair of alignment portions 42. One of each alignment portion is integral with one side of second annular portion. Each alignment portion is divided when the second annular portion is divided in half. Parts of each alignment portion remain when the distal member and the proximal member are formed, and form proximal parts 48 and distal parts 50 respectively. The proximal parts of the proximal member have a threaded hole 52, as shown in FIG. 4. A match mark 53 is etched into an outer surface of the proximal part of the proximal member. The distal parts of the distal member have a hole 54, as seen in FIG. 4. The distal parts have a match mark etched into the outer surface. The match marks of the proximal and distal parts are capable of aligning and aiding in the reattachment of the halves. The threaded hole of the proximal member, is aligned with the hole of the distal member, when the match marks of each are aligned.

Positioned within each hole 54 of the distal parts of the distal member is a cylindrical alignment sleeve 56. Each alignment sleeve, as seen in FIG. 4, has one half of its length within the hole 54 and another half protruding from the distal parts of the distal member. The protruding half of each sleeve is pressed into a receiving slot 58 machined adjacent the entrance to the threaded hole of the proximal parts of the proximal member. The alignment sleeve of each distal member slip fits into the receiving slot of the proximal member when the halves of the second annular member are reattached.

Lastly, a second brass bushing 60 is provided. The second brass bushing is a split bushing. The second bushing, as shown in FIG. 1, is positioned within the second annular portion via locating tangs 61. The locating tangs were machined into the distal member and proximal member adjacent the separation point of the second annular portion. The second bushing is retained in position when the proximal member and distal member are coupled by placing a rod bolt 62 into each alignment portion and through each alignment sleeve. The second bushing is positionable about a portion of the crankshaft when the connecting rod is placed within the internal combustion engine.

The connecting rod of the present invention, formed of maraging steel, has increased strength per unit volume and has less mass. Maraging steel is a special high-strength steel that is hardened by a metallurgical reaction that does not involve carbon. Carbon in an impurity in maraging steel and is kept at the lowest possible concentration.

Maraging steel is strengthened by the precipitation of intermetallic compounds at temperatures of about 480° C. (900° F.). The term "maraging" is derived from "martensite age hardening" and denotes age hardening of a low-carbon martensite matrix. The commercial maraging steels, as used in the present invention, are designed to provide specific levels of yield strength. These yield strengths range from 1030 to 2420 Mpa (150–350 ksi). Some experimental maraging steels yield strengths as high as 3450 Mpa (500 ksi).

The present connecting rod is made from maraging steel because of its superior toughness. The standard age hardening heat treatments produce 0.08% contraction in both the 18 Ni (300) and 18 Ni (350) grades of maraging steel. This very small dimensional change during hardening allow many maragin steel components to be finished machined in the annealed condition. The finished parts then can be hardened without further machining. Maraging steel achieves full hardness by a simple aging treatment rather than depending on cooling rate like some other steels. Therefore, there is almost no distortion which causes maraging steel not to be pone to heat checking.

The following table shows the heat treatments and typical mechanical properties of standard 18 Ni maraging steels.

| GRADE | HEAT TREATMENT (a) | TENSILE STRENGTH | | YIELD STRENGTH | | ELONGATION IN 50 MM OR 2 IN., % | REDUCTION IN AREA % | FRACTURE TOUGHNESS | |
|---|---|---|---|---|---|---|---|---|---|
| | | Mpa | ksi | Mpa | ksi | | | MpaVn | ksiVin. |
| 18 Ni | A | 2050 | 297 | 2000 | 290 | 7 | 40 | 80 | 73 |
| 18 Ni | B | 2450 | 355 | 2400 | 348 | 6 | 25 | 35–50 | 32–45 |

EXAMPLES

1. Treatment A: solution treat (1) hour at 820° C. (1500° F.), then age (3) hours at 480° C. (900° F.).

2. Treatment B: solution treat (1) hour at 820° C. (1500° F.), then age (12) hours at 480° C. (900° F.).

In using maraging steel to make the present invention the connecting rod has less mass and is shaped like a bye-wing. The shape of the present invention allows it to slice through the air/oil mixture of the crankcase, to free up additional horsepower. Efficiency is increased by this structure.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved connecting rod for an internal combustion engine comprising in combination:

an elongated rod portion having an elliptical cross section for optimal stress concentration, the rod being made of maraging steel having a high yield strength;

a first annular portion being integral with a first end of the rod portion, the first annular portion having a bore therethrough and being of an internal diameter for engaging an engine piston pin, the bore capable of receiving a first brass bushing therein, the first annular portion having an axial oil hole distal the rod portion for allowing lubrication of the bushing and the pin;

a second annular portion being integral with a second end of the rod portion and opposite the first annular portion, the second annular portion having a diameter more than twice the diameter of the first annular portion, the second annular portion capable of being divided into halves that form a distal member and a proximal member, the distal member being elliptical and the proximal member being semi-circular;

a vertical hole being within each end of the rod portion, one hole being adjacent the first end of the rod portion and pierces an inner wall of the first annular portion, another hole being adjacent the second end of the rod portion and pierces an inner wall of the proximal member, the vertical hole of each end of the rod portion being used for weight balancing the rod;

a pair of alignment portions with one of each pair of alignment portions integral with one side of the second annular portion, the alignment portions being divided when the distal member and the proximal member are formed, the pair of alignment portions of the proximal member having a threaded hole therein and a match mark etched into an outer surface thereof, the pair of alignment portions of the distal member having a hole therethrough and a match mark etched into an outer surface thereof, the match marks of the proximal and distal members capable of aiding in the reattachment of the halves, the threaded holes of the proximal member capable of being aligned with the holes of the distal member when the match marks of each are aligned;

a pair cylindrical alignment sleeves each having a length, each alignment sleeve having one half of its length being within one of the holes of the alignment portion of the distal member, each alignment sleeve having another half of its length protruding from the one hole of the holes of the alignment portion of the distal member, each protruding half of each sleeve capable of being positioned within a receiving slot adjacent an entrance to one of the threaded holes of the proximal member; and a second brass bushing being positionable within the second annular portion when coupled by placing a rod bolt into each of the pair of alignment portions and through each alignment sleeve therein.

* * * * *